US010619657B2

(12) United States Patent
Mitsch et al.

(10) Patent No.: US 10,619,657 B2
(45) Date of Patent: Apr. 14, 2020

(54) REVERSIBLE CONNECTING OF MACHINE COMPONENTS (71) Applicant: ESM ENERGIE-UND SCHWINGUNGSTECHNIK MITSCH GMBH, Heppenheim (DE)

(72) Inventors: Franz Mitsch, Heppenheim (DE); Frank Heinz, Heppenheim (DE)

(73) Assignee: ESM ENERGIE-UND SCHWINGUNGSTECHNIK MITSCH GMBH, Heppenheim (DE)

( * ) Notice: Subject to any disclaimer, the term of this patent is extended or adjusted under 35 U.S.C. 154(b) by 409 days.

(21) Appl. No.: 15/562,520

(22) PCT Filed: Mar. 29, 2016

(86) PCT No.: PCT/EP2016/000524
§ 371 (c)(1),
(2) Date: Sep. 28, 2017

(87) PCT Pub. No.: WO2016/162111
PCT Pub. Date: Oct. 13, 2016

(65) Prior Publication Data
US 2018/0094658 A1  Apr. 5, 2018

(30) Foreign Application Priority Data

Apr. 4, 2015 (EP) .................................... 15000975

(51) Int. Cl.
F16B 31/00 (2006.01)
F16B 1/00 (2006.01)
(Continued)

(52) U.S. Cl.
CPC ............ *F16B 1/005* (2013.01); *F16B 1/0057* (2013.01); *F16B 4/002* (2013.01); *F16D 1/00* (2013.01); *F16D 1/0805* (2013.01); *F16D 1/087* (2013.01)

(58) Field of Classification Search
USPC .......................................... 411/14.5, 19, 23
See application file for complete search history.

(56) References Cited

U.S. PATENT DOCUMENTS 4,093,052 A * 6/1978 Falk ...................... F16D 1/0805
192/85.12
4,204,413 A * 5/1980 Miller .................. F16D 1/0805
464/26
(Continued)

FOREIGN PATENT DOCUMENTS

DE        94 08 956 U1   11/1994
DE   10 2007 049 901 A1   4/2009
FR         1 315 136        1/1963

OTHER PUBLICATIONS

International Search Report Corresponding to PCT/EP2016/000524 dated Jun. 16, 2016.
(Continued)

Primary Examiner — Gary W Estremsky
(74) Attorney, Agent, or Firm — Davis & Bujold PLLC; Michael J. Bujold (57) ABSTRACT Workpieces that generate pressure by an extrusion media (6, 6a) and are deformed in this way for the secure connection of components (7, 8). In particular, an extrusion billet which comprises an extrudable material or material mixture in the interior thereof, which can be reversibly compressed by a compression die (4) penetrating into the material, such that billet can expand in diameter by increasing the internal pressure in the billet, which leads to a very secure, but reversible press fitting of the different types of components (Continued)

to be connected, in particular of shaft-hub connections for mechanical engineering.

30 Claims, 7 Drawing Sheets

(51) Int. Cl.
*F16B 4/00* (2006.01)
*F16D 1/08* (2006.01)
*F16D 1/00* (2006.01)

(56) References Cited

U.S. PATENT DOCUMENTS 4,264,229 A * 4/1981 Falk ...................... F16D 1/0805
192/85.13
5,099,733 A * 3/1992 Kobayashi ............ B23B 31/305
83/425.3

OTHER PUBLICATIONS

Written Opinion Corresponding to PCT/EP2016/000524 dated Jun. 16, 2016.

* cited by examiner

REVERSIBLE CONNECTING OF MACHINE COMPONENTS

The invention relates to workpieces which deform by means of a displacement medium for secure reversible connection of components.

In particular, the invention relates to a press-fit bolt or a workpiece having a similar action which has in its interior a displaceable material or material mixture which can be compressed reversibly under high pressure by a pressure ram which penetrates into the material, so that the bolt is increased in its outside diameter by increasing the internal pressure in the bolt, resulting in a very secure reversible press fit being achieved with components of various types to be connected, but in particular of shaft/hub connections in mechanical engineering.

The secure connection of components/machine parts is a basic and recurring task in mechanical engineering which has to be achieved in accordance with the respective technical object. It is frequently necessary here for bolts having a press fit to be pressed in so securely that they are connected to one another by the preload pressure and the consequent friction, so that such high friction forces arise in the press fit that the bolts do not loosen by themselves and are thus able to transmit axial forces and torsion moments.

This is achieved in accordance with the prior art by pressing the bolt into a hole with great axial forces.

A further possibility consists in cooling the bolt and/or heating the component with the corresponding hole. A gap arises between bolt and hole due to the shrinkage of the bolt in the case of cooling or expansion of the hole due to heat, so that the bolt can be inserted. As soon as the components have reached their common temperature, a press fit thus arises. This press fit can only be loosened to a limited extent if at all.

It is furthermore known that tubes can be "inflated" under high internal pressure. To date, this process has actually only been used in the tube sector. The inflation or expansion of solid bolts has not been described to date.

The methods known to date for the connection of components by means of bolts or dowel pins generally have the disadvantage that the connection, once made, cannot be broken again without destruction. The components themselves are often adversely affected at the same time. However, breaking of the connections in the course of replacement or maintenance work in an installation is desirable in many cases, in particular in installations, such as, for example, wind turbines, which are subjected to high forces.

The object was thus to provide a connection device in the form of a press-fit bolt or a component having a similar action which, in relation to its connection, is not only very secure where desired, and thus very resistant to high forces, but is also reversible.

The object has been achieved by the provision of a component in accordance with the invention, as described in greater detail below and in the claims.

The component according to the invention is a workpiece which can be expanded or deformed reversibly under pressure, in the simplest case a press-fit bolt or high-pressure dowel pin. However, it may also be part of a shaft or axle, for example at one end of the shaft or axle, but it may also be an integrated constituent a hub, a planetary gear, or planetary arrangement having the features described.

The component or workpiece according to the invention essentially comprises an essentially cylindrical or optionally conical basic body or bolt body (8) which has in its interior one or more cavities in the form of one or more holes, preferably in the direction of its longitudinal axis.

In accordance with the invention, this hole or these holes serve as displacement spaces for displacement media. The displacement space or spaces can have various shapes, but are preferably cylindrical or conical with a tapered or flat end or alternatively are also ring-shaped, for example offset to the inside along the periphery of the cross section of the basic body. The correspondingly shaped hole(s) arranged parallel to the longitudinal axis of the basic body is/can be positioned concentrically also regularly or irregularly around the imaginary central axis of the basic body or bolt, and are open to the top for the introduction of a pressure ram, which is able to fill all or some of the respective cavity or hole and at the same time is capable of compressing the displacement medium. The pressure ram (4) is actuated by means of corresponding tensioning and pressure means, which form the end of the hole and can be of a mechanical or hydraulic nature.

The pressure ram is designed in such a way that it can be introduced into the displacement space provided and is able to at least partly fill the latter by displacement of the displacement medium present. The pressure ram can preferably be cylindrically shaped with a tapered or flat end analogously to a cylindrical displacement space or alternatively ring-shaped, so that it fits into a corresponding ring-shaped displacement space. The pressure ram can have a diameter ($d_2$) which corresponds at most to the diameter ($d_1$) of the displacement space, but in this case a relatively high force must be exerted in order to generate a certain high pressure in the interior of the displacement space. A pressure ram having a diameter which is smaller than the diameter of the displacement space for which the pressure ram is provided is therefore advantageous. In general, the ratio $d_1/d_2$ can be 1-5, preferably 2.0-3.0.

As already mentioned, it is conceivable for a plurality of displacement spaces or holes or cavities to be present along or parallel to the axis of the basic body. In a preferred embodiment, the basic body or bolt is provided with a concentrically arranged, essentially cylindrical cavity or displacement space which is filled with a corresponding displacement medium.

The medium located in the cavities can thus be elastically compressed, or displaced, via the pressure ram and the pressure means, so that the resultant pressure in the interior of the hole is transmitted radially in a uniform manner outwardly to the outside wall of the workpiece or bolt, and deforms the latter by increasing the circumference of the bolt-shaped workpiece, which functions as contact surface (9) for the surrounding component to be connected, for example a hub (7).

In accordance with the invention, specific requirements are to be made of the material properties of the basic body (8) and of the displacement medium (6) in order that a very secure, but reversible connection, which is reliable over a large temperature range, to the component to be connected can be ensured in accordance with the object.

The basic body or bolt body should be designed in such a way that it counters high pressures with a certain elasticity in order that the original shape, or the original circumference of the basic body and thus breaking of the secure connection is achieved again on release of the tension in the system, i.e. reduction in the pressure in the displacement space as a result of withdrawal of the pressure ram.

The most suitable materials have a modulus of elasticity >50,000 N/mm$^2$, preferably >100,000 N/mm$^2$, >150,000 N/mm$^2$, >200,000 N/mm$^2$, >250,000 N/mm$^2$, or >300,000 N/mm$^2$. Particularly suitable materials have a modulus of elasticity between 150,000 N/mm$^2$ and 300,000 N/mm$^2$, such as, for example, steels or steel alloys or materials which have these, in particular between 150,000 N/mm$^2$ and 250,000 N/mm$^2$, preferably between 180,000 N/mm$^2$ and 220,000 N/mm$^2$.

In accordance with the invention, the displacement medium which fills the space of the holes (22) or cavities should have a significantly lower modulus of elasticity and thus higher elasticity than the basic body/bolt body itself. In accordance with the invention, the modulus of elasticity of the displacement medium should be less than 20% of the modulus of elasticity of the material of the basic body/press-fit bolt, but preferably less than 15%, 10%, 5%, 1% or 0.001%. The ideal modulus of elasticity of the displacement medium in accordance with the invention is between 0.001% and 20%, in particular between 0.001 and 10% of the modulus of elasticity of the surrounding basic body.

However, a displacement medium which is suitable for achieving the object set must also have a coefficient of thermal expansion which ideally if possible does not differ or only differs insignificantly from the coefficient of expansion of the basic body, i.e., for example, steel, since otherwise the connection made at a certain temperature may break or loosen again in the event of temperature differences occurring later in the installation (between −40° C. and +60° C.), or in the reverse case an inadmissibly high surface pressure arises in the component to be connected, that the latter is "broken open", with the result that the connection is no longer ensured or can only be broken again with difficulty if this were to become necessary, such as, for example, on replacement of components.

However, conventional materials which, in accordance with the first requirement, are to have a significantly lower modulus of elasticity (<30,000 N/mm$^2$, preferably >10,000 N/mm$^2$, >1000 N/mm$^2$) than the basic body (8), generally have a very much higher coefficient of expansion than the suitable basic body materials having the requisite moduli of elasticity between 50,000 and 300,000 N/mm$^2$. In general, steels are employed for the basic body according to the invention.

It was therefore also an object of the invention to provide materials as displacement medium that have a significantly smaller modulus of elasticity than the surrounding material of the basic body or bolt (for example made from steel or steel alloy), but at the same time have a coefficient of thermal expansion acting overall which is comparable with the coefficient of expansion of the bolt/basic body (example steel or steel alloy), i.e. differs from the latter by only 0-10%, preferably 0-5%. Such materials as displacement medium which can be employed in accordance with the invention may also be mixtures of different materials and are disclosed and described in detail below.

The invention thus relates to a workpiece which can be deformed reversibly by pressure, in particular in the form of a press-fit bolt, a dowel pin, a shaft, an axle, a hub, a part of a shaft or axle, a part of a hub, or a component in connection with a clutch or a planet carrier or planetary gear, for the secure reversible connection of machine components, comprising:
(i) an essentially cylindrical basic body (8) which has on its periphery a contact surface (9) to a surface of the machine component (7) to be connected,
(ii) at least one displacement space (22) (23) in the interior of the basic body, which is completely or partly filled with a displacement medium (6) (6a) which is liquid or flowable and/or solid in powder form or granulated form,
(iii) pressure and tensioning means (1) (2) (3) (5) (14)-(20), and (iv) at least one pressure ram (4), which is designed in shape and size in such a way that it can be pushed completely or partly into the displacement space by means of the pressure and tensioning means in order to compress the displacement medium located therein, resulting in an increase in the circumference of the basic body over the contact surface (9) and thus the formation of a very secure reversible connection to the machine component to be connected, where the displacement medium employed in one or more displacement spaces has a modulus of elasticity acting overall of at most 25%, preferably of at most 20% of the modulus of elasticity of the material of the basic body (8), or is preferably 0.001%-15% of the modulus of elasticity of the basic body, and has a coefficient of expansion acting overall which differs by a maximum of 10%, preferably by 0-5%, from the coefficient of expansion of the basic body.

In order to meet the requirement for a suitable coefficient of expansion of the displacement medium, it is also possible in accordance with the invention to provide a plurality of displacement spaces which are filled with materials having different coefficients of expansion, where the coefficient of expansion acting overall must meet the above-mentioned condition, namely to differ by not more than 10% from the coefficient of expansion of the material of the basic body or bolt. The invention thus also relates to a corresponding workpiece in which the basic body (8) has a first displacement space (22) with a displacement medium (6) and at least one second displacement space (23) with a displacement medium (6a), where the first displacement medium has a different coefficient of expansion than the second, but in particular has a higher coefficient of expansion than the basic body (8) and the second displacement medium has a lower coefficient of expansion than the basic body. In this case, it has been found that the best results were achieved when the displacement medium having the lower coefficient of expansion has a value of $<11.0\times10^{-6}$/K, preferably $<2.0\times10^{-6}$/K.

In a particular embodiment of the invention, the basic body is provided with a first displacement space (22) having a ring-shaped design which is arranged in the interior along the periphery of the basic body (8), and is provided with a second displacement space (23) which has the shape of a hollow cylinder and is positioned concentrically, where the first ring-shaped displacement space (22) is arranged around the second displacement space (23). However, it is also conceivable for the basic body to be provided with a first outer ring of hollow cylinders which are arranged radially in the cylindrical basic body, and a second inner ring of hollow cylinders or a single concentric hollow cylinder. Greater flexibility of moduli of elasticity and coefficients of expansion can thus be achieved through corresponding choice of the displacement media in order to achieve the desired results.

In the case of the use of a plurality of displacement spaces, a plurality of pressure rams or devices functioning as pressure rams can also be employed, which can have a positive effect on the pressure distribution and thus on the uniform expansion of the bolt/basic body.

In accordance with the invention, certain requirements are also made of the geometry of the holes/cavities/displacement spaces in relation to the basic body or bolt surrounding them.

Thus, a hole in the interior of the workpiece or press-fit bolt along the longitudinal axis of the component especially shorter than the press-fit bolt or basic body itself and has a length ($l_2$) which is greater than, equal to or also shorter than the length ($l_1$) which corresponds to the common surface of bolt or basic body and surrounding component to be connected. Only in this way can a uniform pressure distribution over the connection surface be achieved. Optimum results can be achieved if said length ratios are in the following range: $l_2=0.75$ to $1.25\ l_1$. Ideally, $l_2$ is about 13-15% greater than $l_1$. Furthermore, it is advantageous to design the outlet of the hole in a tension-optimised manner.

If the workpiece has only one hole, this is preferably arranged concentrically. However, the workpiece may, as already mentioned, also have a plurality of holes with pressure rams and tension/pressure devices. In this case, the holes are distributed radially and preferably uniformly or acting equally along the periphery of the cylindrical workpiece.

A further important geometrical requirement of the workpiece according to the invention is that the pressures transmitted by the pressure ram and the displacement medium can be transmitted adequately to the contact surface (9), so that the corresponding outside surface is expanded reversibly. Only in this way can a secure friction tension-based connection to the corresponding surface of the surrounding component be achieved.

In order to ensure this, it is necessary in accordance with the invention that the diameter of the preferably cylindrical hole ($d_1$) and the distance of the hole (=outer surface of the displacement space (22) (23)) from the outer surface of the preferably cylindrical basic body ($l_3$) are in a certain ratio to one another. It has been found that the reversible expansion for a certain displacement medium compressed with a defined force is optimum if the ratio ($l_3$)/($d_1$) is 0.05 to 3, preferably 0.125 to 1.5.

The invention thus relates to a corresponding workpiece, or a corresponding bolt, etc., in which the ratio separation ($l_3$) between contact surface (9) and outer surface of displacement space (22) (23) to diameter ($d_1$) of the displacement space (22) (23) is 0.05 to 3, preferably 0.125 to 1.5.

A further geometrical requirement is that the diameter of the pressure ram (d2), which is intended to displace displacement medium, should be in a certain ratio range to the diameter of the displacement space ($d_1$) in order to be able to achieve optimum results.

The invention thus also relates to a corresponding workpiece, or a corresponding bolt, etc., in which the ratio diameter ($d_1$) of the displacement space (22) (23) to diameter ($d_2$) of the pressure ram (4) is 1.01 to 5.0, preferably 2 to 3.5.

The basic body (8) must withstand high pressures, but must in principle not be non-elastic. It should therefore consist of a material having a modulus of elasticity in a range between 70,000 and 300,000 N/mm². It preferably consists of steel or a steel alloy or a material which contains steel or steel alloy having a modulus of elasticity between 180,000 and 220,000 N/mm².

The displacement medium (6) (6a) used for the cavities/displacement spaces described should, as defined at the outset, have a modulus of elasticity acting overall of at most 20% of the modulus of elasticity of the material of the basic body (8), but at the same time should also have a coefficient of expansion which is very similar to that of the basic body, and differs therefrom by not more than 10%.

This can only rarely be achieved by a single material component, as can be seen from Tab. 1.

TAB. 1

Moduli of elasticity and coefficients of thermal
expansion of various materials

| Material | Modulus of elasticity ($N/mm^2$ = MPa) | Coefficient of expansion (length) ($10^{-6}$/K) |
|---|---|---|
| Steels | 180,000-215,000 | 11-16 |
| Invar (iron/nickel alloy) | 140,000-150,000 | 1.5-2.5 |
| Iron | 195,000 | 12-13 |
| Aluminium | 70,000 | 23-24 |
| Copper | 140,000 | 16-17 |
| Nickel | 215,000 | 13 |
| Graphite | 27,000 | 2 |
| Quartz | 95,000 | 0.5 |
| Glasses, porcelain | 40,000-90,000 | 3-9 |
| Glass-ceramic | 90,000-100,000 | <0.5 |
| Concrete, cement | 22,000-45,000 | 12 |
| Silicon | 107,000 | 2-3 |
| Plastics | 1000-5000 | 50-180 |
| Rubber (natural rubber) | 10-100 | 160-220 |
| Wood | 500-16,000 | 7-9 |
| Carbon fibres | 70,000-300,000 | −0.1 |
| Glass fibres | 7000-90,000 | 5 |

The invention therefore also relates to corresponding workpieces in which the displacement medium (6) (6a) is a mixture of at least two components, each having different moduli of elasticity and/or coefficients of expansion, where these are in each case selected so that the total modulus of elasticity and the total coefficient of expansion assumes the values or ranges given above and in the claims.

In a preferred embodiment, the displacement medium (6) (6a) is a binary or ternary mixture. Alternatively, it is possible to employ two or three different displacement media having different moduli of elasticity and/or coefficients of thermal expansion in corresponding two or three displacement spaces (22) (23).

It has been found that particularly good results can be achieved if at least one displacement medium or at least one component of a displacement medium is a material selected from the following group: graphite, quartz, glass fibre, iron/nickel alloy, a plastic, a plastic mixture or an elastomer.

It has furthermore been found that particularly good results can be achieved if at least one first displacement medium or at least one component thereof comprises graphite, quartz, glass fibres or iron/nickel alloy, and a second displacement medium or a second component of the first displacement medium is a plastic, a plastic mixture or an elastomer, and the basic body (8) essentially consists of a material having a modulus of elasticity between 70,000 and 300,000 $N/mm^2$. In a preferred embodiment in this respect, the basic body essentially consists of steel or steel alloy having a modulus of elasticity between 180,000 and 220,000 $N/mm^2$ and a coefficient of expansion between 10 and $20 \times 10^{-6}$/K.

In a further embodiment, the displacement medium is a binary mixture, where the two components are selected from the group consisting of:

| (i) | polyester, PVC or elastomer and quartz or glass fibre |
| (ii) | polyester, PVC or elastomer and iron/nickel alloy |
| (iii) | polyester, PVC or elastomer and graphite |
| (iv) | epoxy resin and graphite |
| (v) | glycols or oils and graphite. |

The two components may also, as outlined, be accommodated in separate displacement spaces.

Particularly advantageous displacement media have proven to be those which comprise graphite and/or quartz in a range from 60-98%, preferably 75-90% of graphite or quartz or iron/nickel alloy.

The workpieces according to the invention are intended above all for:
(i) the secure installation and non-destructive deinstallation of machine components in devices and installations which are subjected to moderate to large forces,
(ii) making of shaft/hub connections,
(iii) installation in wind turbines.

The invention thus also relates to wind turbines or other industrial machines or installations which are subjected to large forces.

The invention is described in greater detail below.

| 1 | Pressure ring |
| 2 | Tensioning screw |
| 3 | Fixing of pressure ram |
| 4 | Pressure ram |
| 5 | Closure element |
| 6 | First displacement medium, hydraulic displacement material |
| 6a | Second displacement medium, hydraulic displacement material |
| 7 | Hub |
| 8 | Bolt, basic body |
| 9 | Contact surface |
| 10 | Pressure ring for peripheral press-fit bolt |
| 11 | Clamping unit per axle |
| 12 | Axle with a number A number of clamping units |
| 13 | Seal for low-viscosity media |
| 14 | Pressure screw |
| 15 | Preload distance |
| 16 | Preload sleeve |
| 17 | Securing plate |
| 18 | Securing screw |
| 19 | Hydraulic cylinder |
| 20 | Fixing screw |
| 21 | Installation aid |
| 22 | First displacement space |
| 23 | Second displacement space |

FIG. 1 to FIG. 9 show a section through a typical bolt in accordance with the invention.

A hole having a diameter ratio of about 1.25-4 (ratio of outside diameter to hole diameter), for example, is introduced into a bolt. For an outside diameter of the bolt of 100 mm, this corresponds to a hole which is in a range from 25 mm to 80 mm. A medium (hydraulic displacement material item 6) is introduced into this hole. This medium is compacted by means of the pressure ram item 4 to such an extent that a high-pressure arises in the bolt. The diameter of the pressure ram item 4 is ideally smaller than the diameter (d1) in which the hydraulic displacement material has been introduced (diameter ratio 2.5-3.75), since the smaller the selected diameter (d2) of the pressure ram, the higher the pressure that arises in the interior of the bolt, for the same force with which the pressure ram is pressed into the medium. However, holes having a diameter ratio of 1-5 are entirely conceivable. For a hole diameter of 60 mm, this corresponds to a diameter of the pressure ram of 12 to 60 mm. In the case of the use of a pressure ram having a small diameter, a large pressure ratio arises, so that the pressure ram must consist of solid material having greater than 1000 $N/mm^2$.

Changes in the size of the outside diameter of up to 0.25% arise depending on the conditions. This means that, for an initial diameter of 100 mm, an outside diameter of 100.25 mm is established after the expansion. The expansion can be controlled precisely here via the immersion distance. The achievable size orders of the expansion are sufficient for a press fit.

The drawings show various possibilities. Thus, for example, the pressure ram item 4 in FIGS. 1-5 and 8 is designed with a tip, while a blunt ram is used in FIG. 6. The blunt ram has the disadvantage that the recovery of the expansion after the ram has been withdrawn is only partial. It is therefore advantageous to provide the pressure ram with a tip or a rounded tip or to taper it conically at the lower end. The displacement medium (6) is consequently pushed back to a greater extent when the ram is withdrawn than in the case of the use of a blunt ram analogously to FIG. 6.

Figure 1:
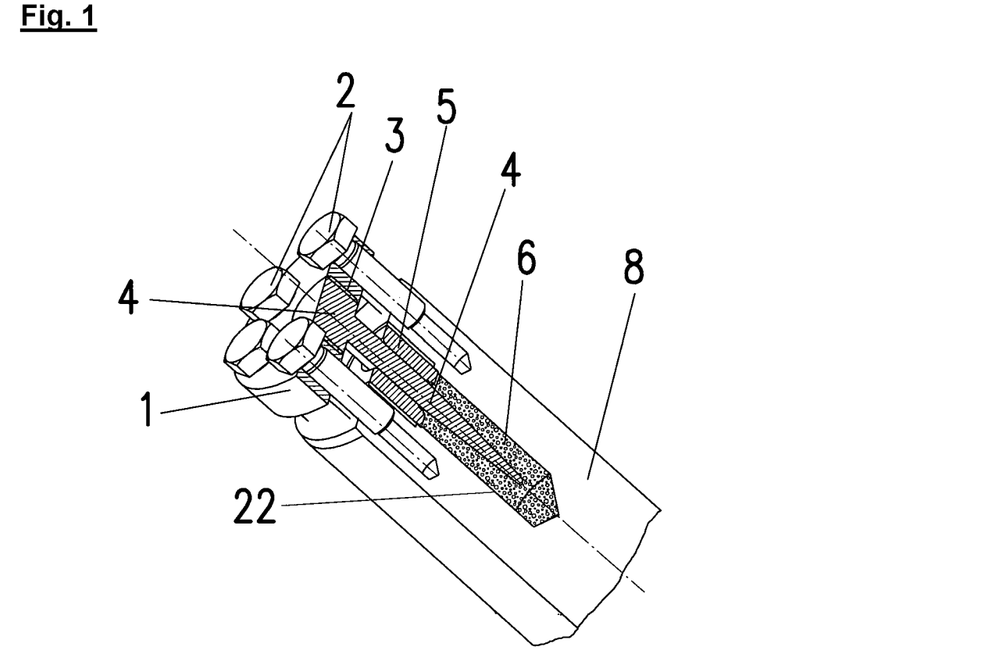
FIG. 1 shows a sectional view of one embodiment of a workpiece for a secure reversible connection of machine components according to the principles of the present disclosure.
Figure 2:
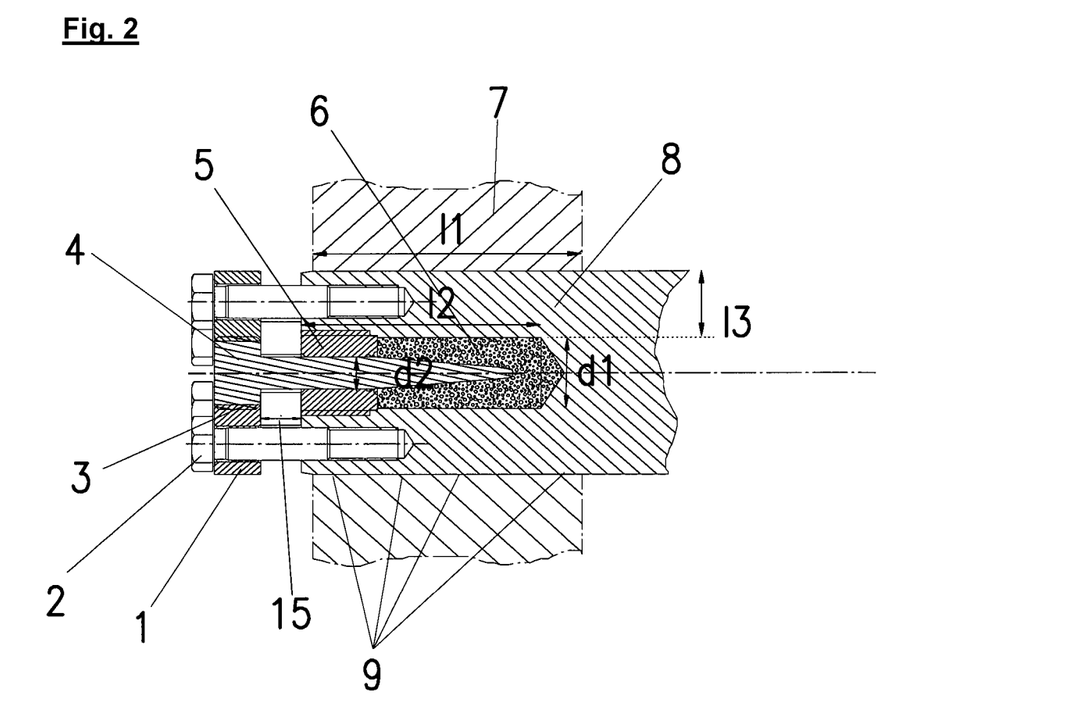
FIG. 2 shows a sectional view of one embodiment of a workpiece for a secure reversible connection of machine components according to the principles of the present disclosure.
Figure 3:
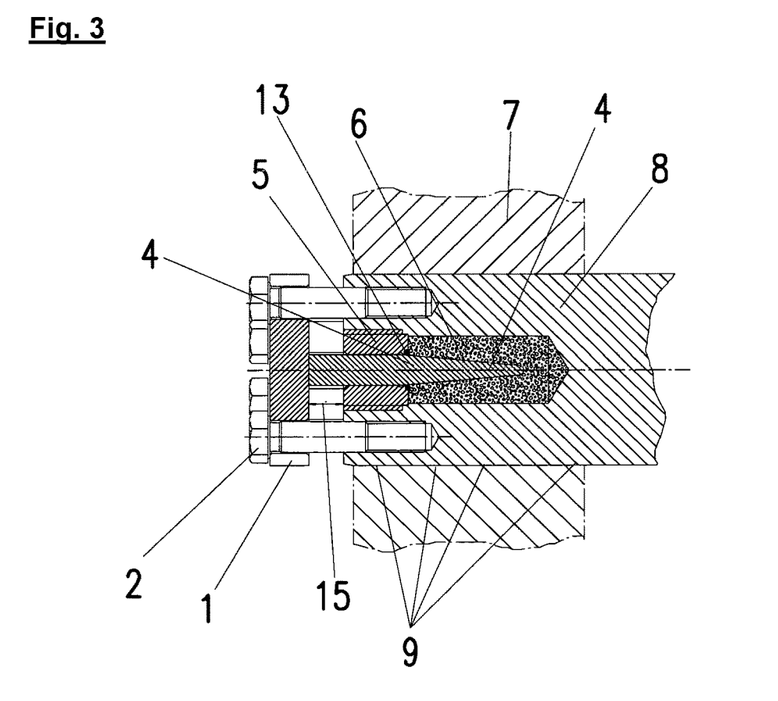
FIG. 3 shows a sectional view of one embodiment of a workpiece for a secure reversible connection of machine components according to the principles of the present disclosure.
Figure 4:
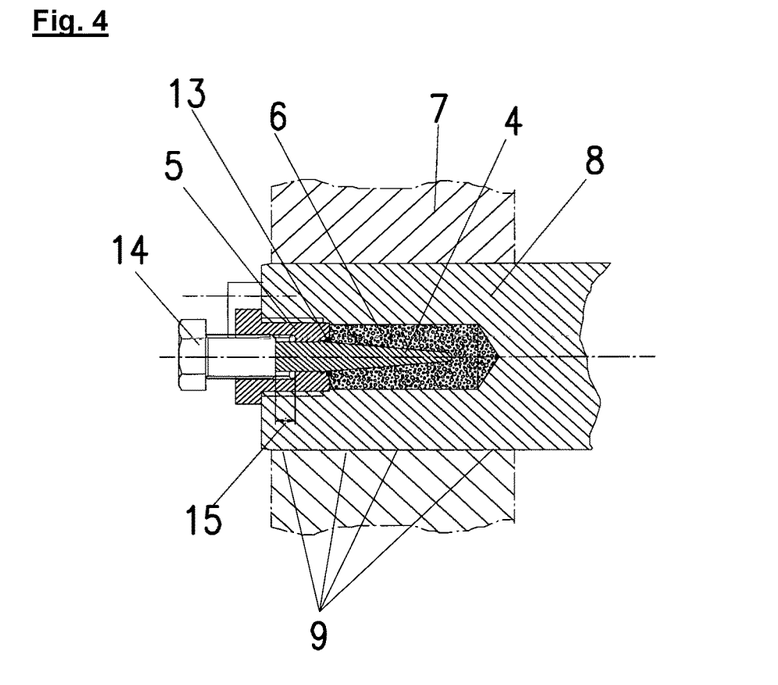
FIG. 4 shows a sectional view of one embodiment of a workpiece for a secure reversible connection of machine components according to the principles of the present disclosure.
Figure 5:
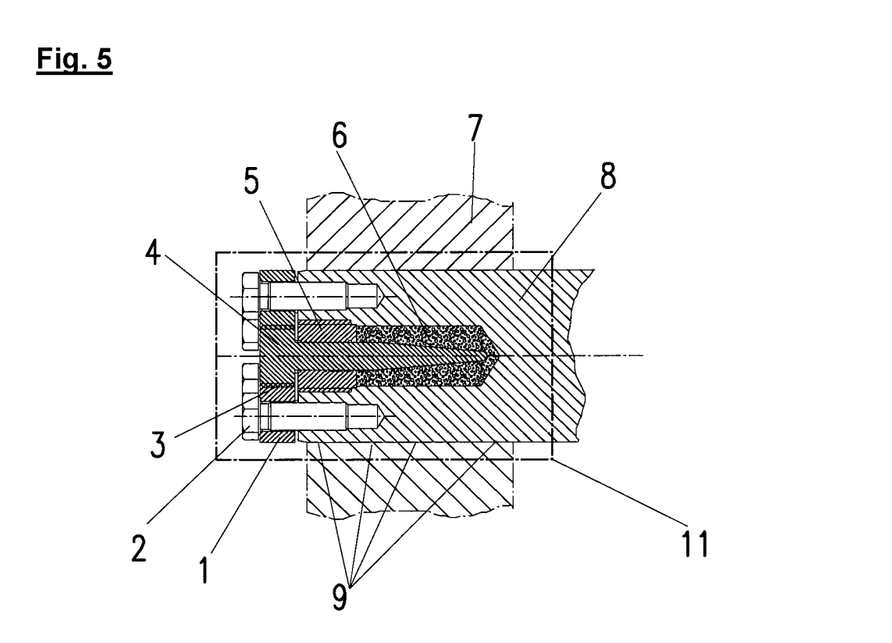
FIG. 5 shows a sectional view of one embodiment of a workpiece for a secure reversible connection of machine components according to the principles of the present disclosure.
Figure 6:
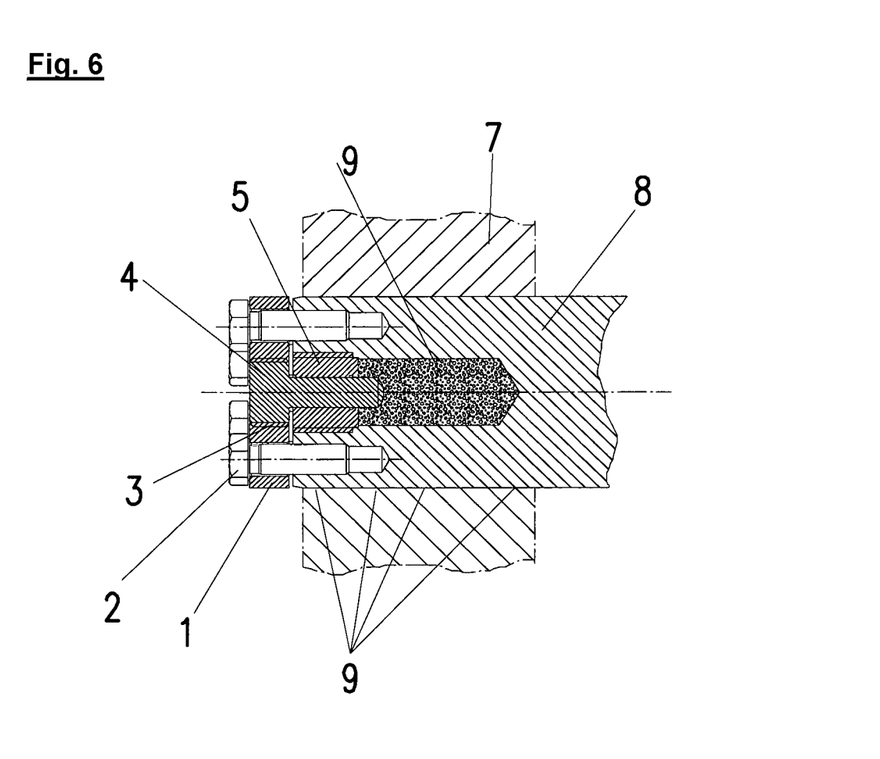
FIG. 6 shows a sectional view of one embodiment of a workpiece for a secure reversible connection of machine components according to the principles of the present disclosure.

The pressure ram (4) is pressed in either by means of a plurality of relatively small screws via a pressure plate item 1 or alternatively, as shown in FIG. 4, by means of a single screw of greater diameter.

Figure 7:
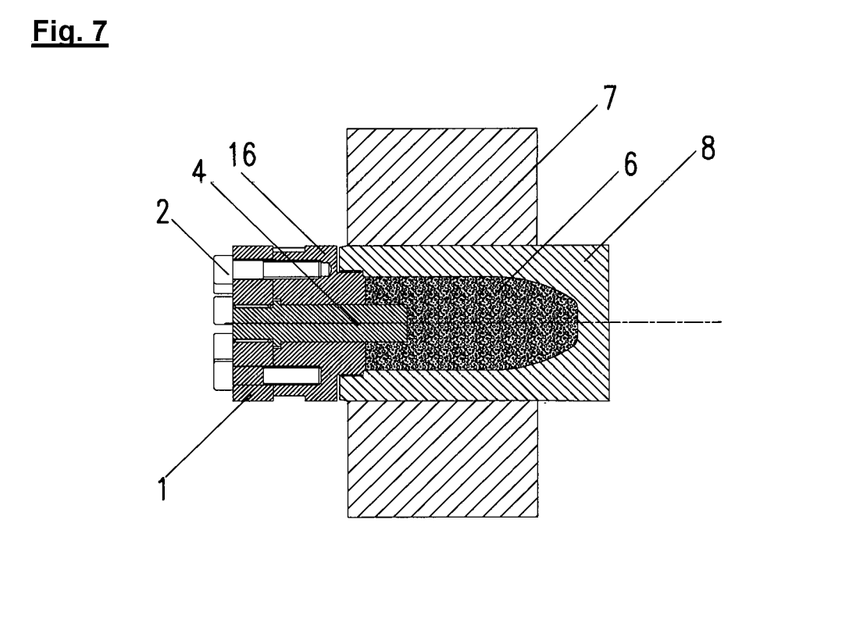
FIG. 7 shows a sectional view of one embodiment of a workpiece for a secure reversible connection of machine components according to the principles of the present disclosure.
Figure 8:
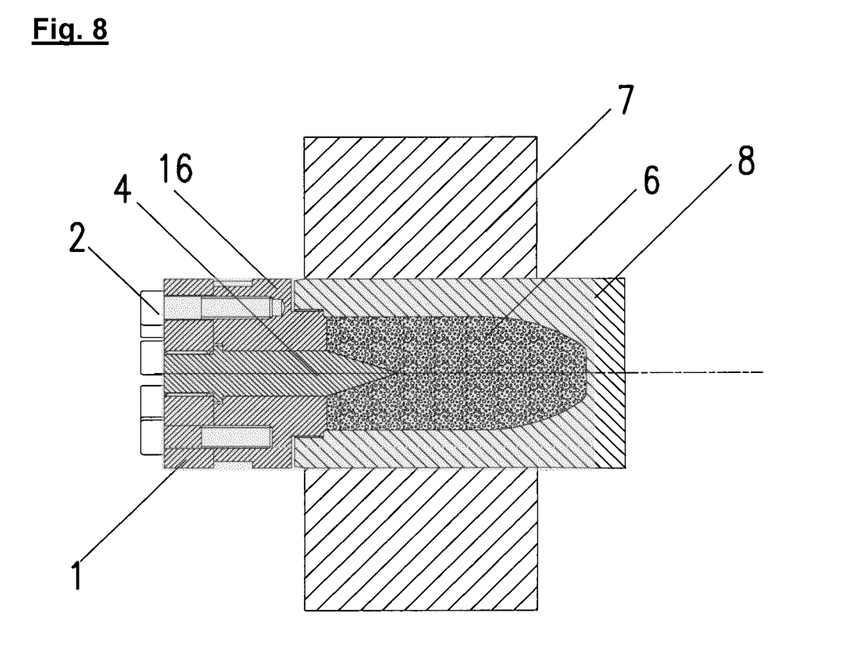
FIG. 8 shows a sectional view of one embodiment of a workpiece for a secure reversible connection of machine components according to the principles of the present disclosure.

FIG. 7 and FIG. 8 shows a variant having a greater hole diameter. In this variant, the threaded holes are no longer accommodated in the bolt, but instead in the preload sleeve, item 16. The preload sleeve is screwed together with the bolt. The hole outlet is designed in such a way that the stresses which arise as a consequence of the expansion are reduced to a minimum.

Figure 9:
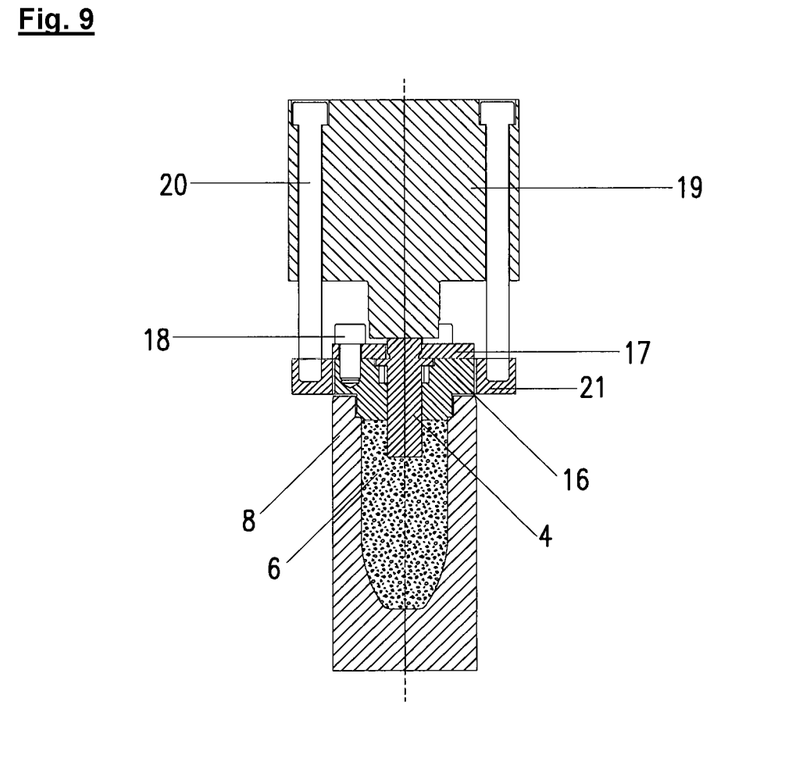
FIG. 9 shows a sectional view of one embodiment of a workpiece for a secure reversible connection of machine components according to the principles of the present disclosure.

A further possibility is to press the pressure ram hydraulically into the medium via a round block cylinder, as shown in FIG. 9, and to secure the pressure ram against moving out by means of a plurality of small screws with a securing plate item 17. The round block cylinder is fixed to the preload sleeve, item 16, via an external thread. An advantage of this variant is the simplified and shorter installation.

For the case where the pressure ram (4) does not exit from the medium (6) on its own, fixing to the pressure ram item 3 is provided, by means of which the ram can be withdrawn from the medium in order to be able to reverse the expansion.

The medium is ideally a material which has a significantly lower modulus of elasticity than steel. Unfortunately, such materials generally have a very much higher coefficient of thermal expansion than steel. This has the consequence that the press fit is destroyed by the different expansion, so that the fit would fail in the case of particularly low temperatures of the components. Due to the greater coefficient of thermal expansion, the medium shrinks to a greater extent than the bolt itself, so that the pressure in the interior of the hole drops due to this behaviour and the expansion thus subsides and the press fit would accordingly fail.

Flowable materials having the lowest possible thermal expansion, such as, for example, polyester or PVC, are suitable.

Such materials have a coefficient of expansion of $50\text{-}80\times10^{-6}/K$ (rubber, for example, has a coefficient of expansion of about $200\times10^{-6}/K$). For comparison, steel has a coefficient of expansion which is in a range from $11\text{-}13\times10^{-6}/K$. Such materials are thus also still unsuitable for guaranteeing the join in the event of temperature variations.

The solution according to the invention is now to use a second material having a particularly low coefficient of thermal expansion and to mix this with a flowable material in the appropriate ratio.

An example is quartz flour, which has a coefficient of expansion of about $0.5\times10^{-6}/K$. If this quartz flour is stirred into polyester with an appropriate ratio, the coefficient of thermal expansion of the polyester/glass mixture can be corrected to the value of steel.

It is furthermore possible to fill an additional cavity with a material having particularly low thermal expansion. To this end, it is likewise possible to use quartz, and virtually any material which has a very small coefficient of thermal expansion.

In addition, it is also possible to use the material Invar®, which consists of 64% of iron and 36% of nickel, or similar materials. This has a coefficient of expansion of about zero. It is also possible to admix Invar dust or powder to the media having higher coefficients of expansion and thus to achieve the coefficient of expansion of the surrounding steel.

In accordance with the invention, an elastomer/graphite mixture has proven to be a very suitable material combination. Like Invar® or glass, graphite also has a very low coefficient of thermal expansion ($2\times10^{-6}/K$) and for this reason is, like Invar or glass, particularly suitable for mixing with a flowable material which has a high coefficient of thermal expansion.

A great advantage of graphite over glass and Invar® is the very good self-lubrication. This behaviour results in a significant reduction in frictional forces. Furthermore, it has been found that graphite, even in the unmixed compacted state, is suitable as hydraulic displacement material. The fact that graphite is suitable as hydraulic displacement material even without admixture of a flowable material represents a further advantage of the material graphite. So that, in the case of this material, a material is required that is admixed with the graphite in the appropriate ratio in order to increase the coefficient of thermal expansion of graphite. In the case of the other material combinations mentioned, by contrast, a material having a low coefficient of thermal expansion is required in order to reduce the coefficient of expansion. Thus, for example, a rubber or a synthetic elastomer can be admixed with the graphite.

Besides rubber, however, other elastomers having coefficients of thermal expansion which are in a range from $100\text{-}230\times10^{-6}/K$ are also suitable.

Experiments have shown that, besides graphite, possible materials are all those which have a low coefficient of expansion and high sliding or lubrication properties. It is also possible to prepare the medium from graphite and epoxy resin in the appropriate ratio.

A further possibility for correcting the coefficient of thermal expansion of graphite to the value of steel is the addition of liquids and oils, such as, for example, hydraulic oil or glycol, paraffin (paraffin oil), petroleum, turpentine oil or silicone oil. Due to the simple handling with respect to installation and non-destructive deinstallation and the small construction space, the invention presented here, by means of which axial forces and torsion moments can be transmitted, can be employed for virtually all shaft/hub connections in mechanical engineering.

Figure 10:
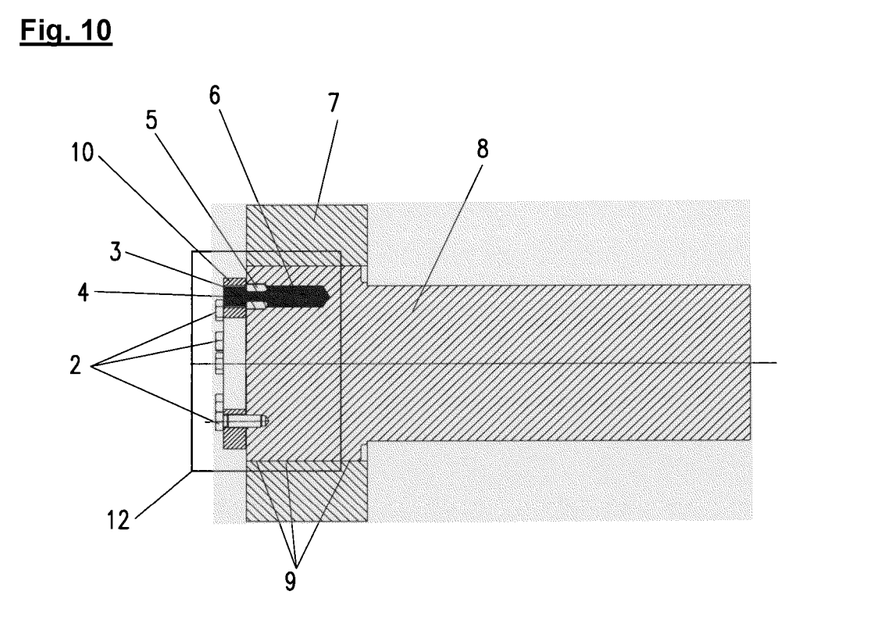
FIG. 10 shows a sectional view of one embodiment of a workpiece for a secure reversible connection of machine components having a plurality of clamping units according to the principles of the present disclosure.
Figure 11:
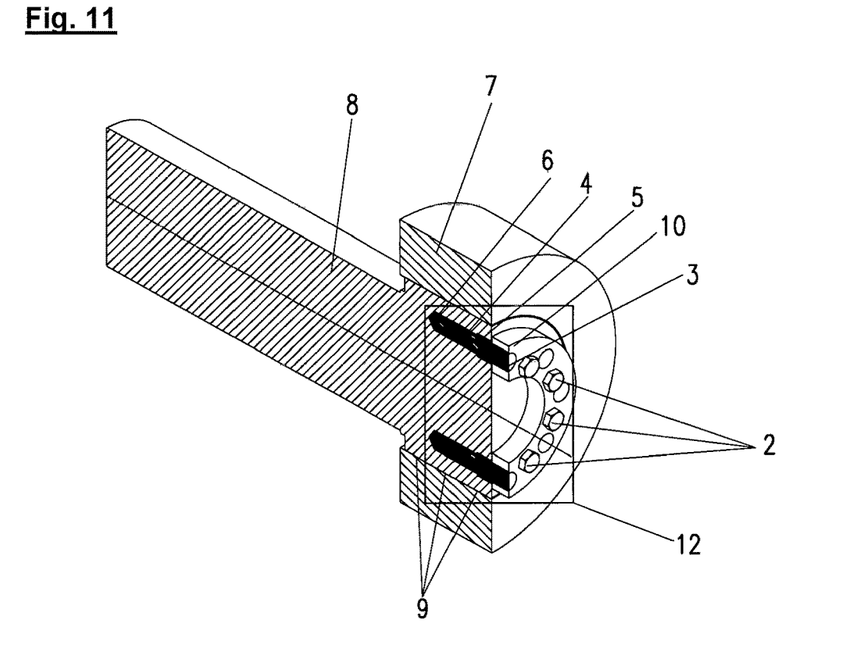
FIG. 11 shows a sectional view of one embodiment of a workpiece for a secure reversible connection of machine components having a plurality of clamping units according to the principles of the present disclosure.

FIGS. 1-9 show elements which expand a bolt having a manageable diameter. A further method is described in FIG. 10 and FIG. 11. In this method, a plurality of clamping units (11) are arranged on the periphery in FIG. 5. These effect radial expansion of the axle, so that fixing of the bolt (8) in the hub (7) is also facilitated hereby. A wavy outside diameter which is greater in the region of the elements than between the elements arises on the axle in this case. This waviness is reduced by the resistance of the hub (7)

Figure 12:
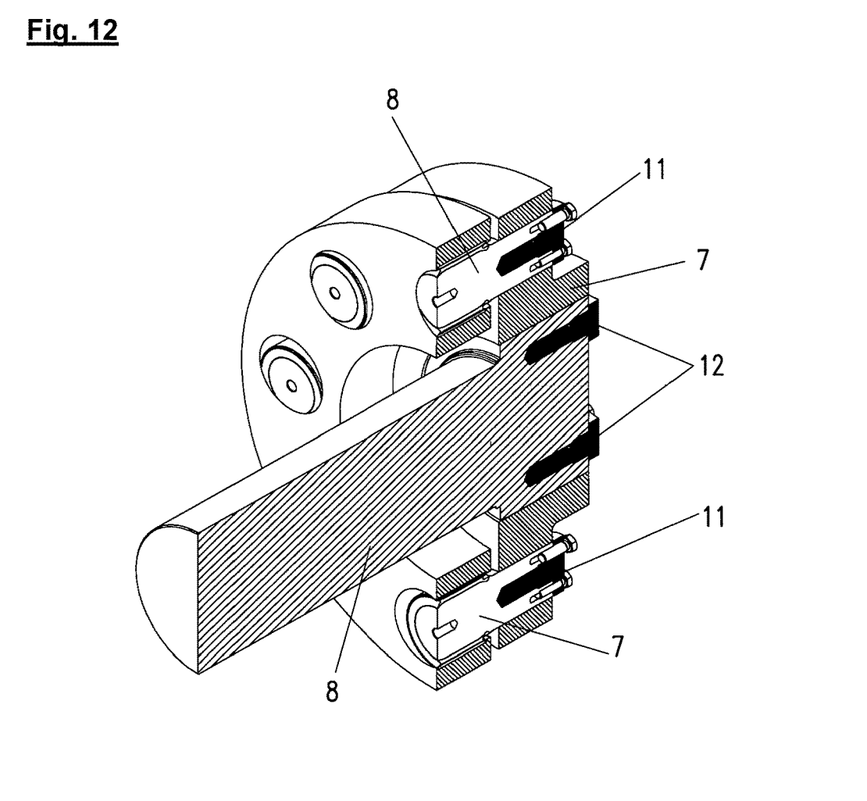
FIG. 12 shows a sectional view of one embodiment of a workpiece for a secure reversible connection of machine components according to the principles of the present disclosure.
Figure 13:
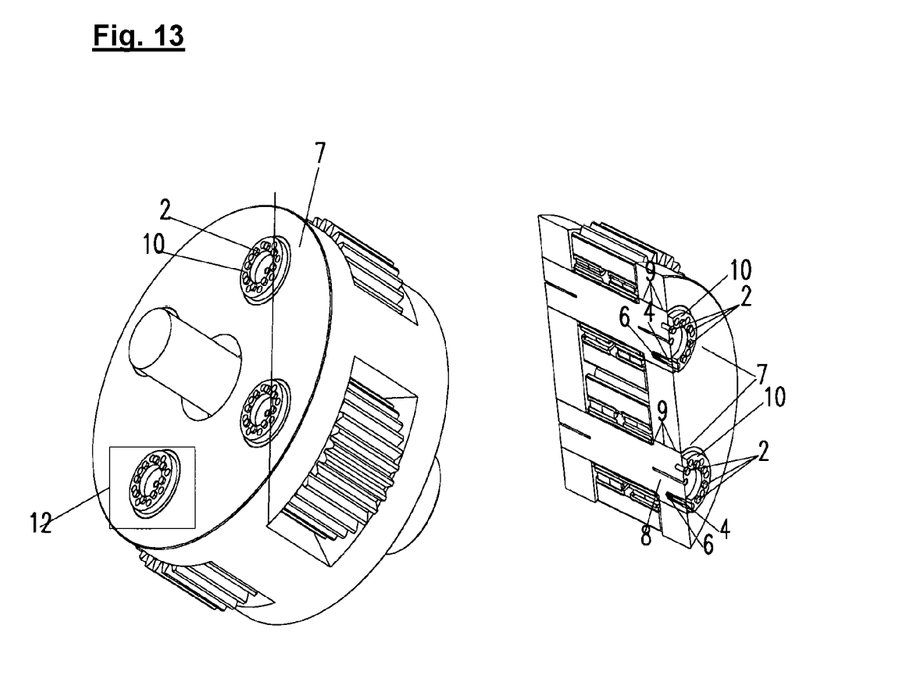
FIG. 13 shows a sectional view of one embodiment of a workpiece for a secure reversible connection of machine components according to the principles of the present disclosure.

FIGS. 12 and 13 show further areas of application of the elements.

FIG. 12 shows a clutch in which the individual elements are arranged a number of times on the periphery by means of one clamping unit per axle. In the same figure, the inner bolt is fixed in the hub (7) by means of a plurality of elements on the periphery.

FIG. 13 shows the application on use in a planet carrier/planet bearing, as has been described, for example, in EP13004936.4. The fixing of the bolt by means of the elements described above is a very great advantage here, since the entire planet carrier becomes capable of disassembly with this design, so that the roller bearings and the elastomer bearings described in said application can be exchanged more simply. According to the prior art to date, bolts of this type are installed with a cold/warm press connection and can thus no longer be loosened non-destructively.

Figure 14:
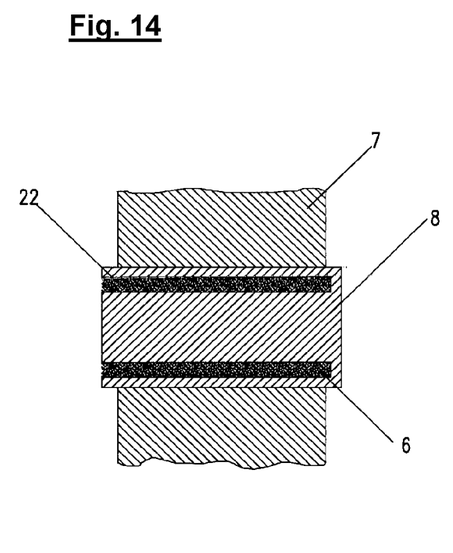
FIG. 14 shows a sectional view of one embodiment of a workpiece for a secure reversible connection of machine components according to the principles of the present disclosure.
Figure 15:
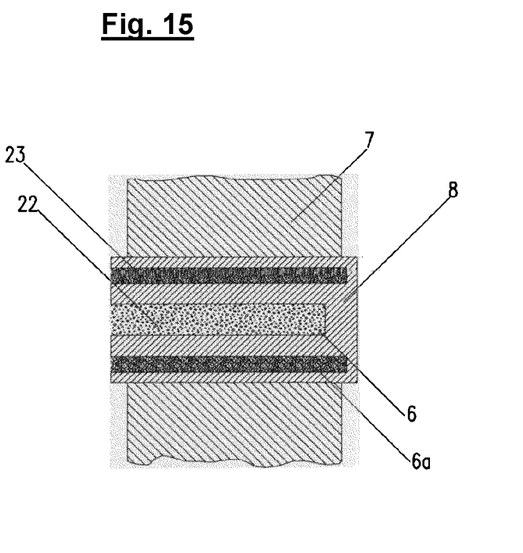
FIG. 15 shows a sectional view of one embodiment of a workpiece for a secure reversible connection of machine components according to the principles of the present disclosure.

FIGS. 14 and 15 show a press-fit bolt according to the invention which has a ring-shaped displacement space (22) in the outer region of the bolt or basic body (8). This is completely or partially filled with a displacement medium. FIG. 15 thus represents an alternative to FIG. 1 or FIG. 2, in which the displacement space (22) is a concentrically positioned hollow cylinder. FIG. 14 depicts a press-fit bolt in which, in addition, a second displacement space (23) is present, which is in the form of a concentrically arranged hollow cylinder here. In this embodiment, the pressure ram (4) is preferably provided for the ring-shaped opening of the first displacement space and is provided with the corresponding geometry. Conversely, the central cavity can also be provided as pressing space for the pressure ram.

The invention claimed is:

1. A workpiece, which can be reversibly deformed by pressure for a secure reversible connection of machine components, comprising:
   (i) an essentially cylindrical basic body (8) which has, on its periphery, a contact surface (9) to a surface of the machine component (7) to be connected,
   (ii) at least one displacement space (22,23) in an interior of the basic body, which is completely or partly filled with a displacement medium (6, 6a) which is liquid or flowable and/or solid in powder form or granulated form,
   (iii) pressure and tensioning means (1, 2, 3, 5, 14-20), and
   (iv) at least one pressure ram (4) which is designed, in shape and size, in such a way that the at least one pressure ram (4) can be pushed completely or partly into the displacement space by the pressure and tensioning means in order to compress the displacement medium located therein thereby resulting in an increase in a circumference of the basic body over the contact surface (9) and thus formation of a very secure reversible connection to the machine component to be connected,
   wherein the displacement medium employed, in one or more displacement spaces, has a modulus of elasticity acting overall of at most 20% of a modulus of elasticity of the material of the basic body (8), and has a coefficient of expansion acting overall which differs by a maximum of 10% from a coefficient of expansion of the basic body.

2. The workpiece according to claim 1, wherein the coefficient of expansion of the displacement medium (6) differs from that of the basic body (8) by 0-5%.

3. The workpiece according to claim 1, wherein the modulus of elasticity of the displacement medium (6) is 0.001%-15% of the modulus of elasticity of the basic body (8).

4. The workpiece according to claim 1, wherein the displacement space (22, 23) has a displacement space length ($l_2$) in the axial direction which is a maximum of 25% larger or a maximum of 25% smaller than a contact surface length ($l_1$) which corresponds to the length of the common contact surface (9).

5. The workpiece according to claim 4, wherein the displacement space length ($l_2$) is 10-15% larger than the contact surface length ($l_1$).

6. The workpiece according to claim 1, wherein the ratio of a length ($l_3$)/diameter ($d_1$) is 0.05 to 3, where the length ($l_3$) is a distance between the contact surface (9) and the outer surface displacement space (22, 23) and the diameter ($d_1$) is a diameter of the displacement space (22, 23).

7. The workpiece according to claim 6, wherein the ratio of the length ($l_3$)/diameter ($d_1$)=0.125 to 1.5.

8. The workpiece according to claim 1, wherein the ratio of a diameter ($d_1$) of the displacement space (22) to a diameter ($d_2$) of the pressure ram (4) is 1.01 to 5.0.

9. The workpiece according to claim 8, wherein the ratio is 2 to 3.5.

10. The workpiece according to claim 1, wherein the at least one displacement space (22, 23) in which the displacement medium (6, 6a) is located essentially has a cylindrical, conical or ring shape.

11. The workpiece according to claim 10, wherein the pressure ram is designed in such a way that the pressure ram fits entirely or partly into the cylindrical, conical or ring-shaped displacement space.

12. The workpiece according to claim 1, wherein the pressure ram (4) is designed with any desired face contour.

13. The workpiece according to claim 1, wherein the pressure ram (4) is operated by hydraulic means (19).

14. The workpiece according to claim 1, wherein the basic body (8) has a first displacement space (22) with a first displacement medium (6) and at least one second displacement space (23) with a second displacement medium (6a), where one of the first and the second displacement mediums has a higher coefficient of expansion and the other of the first and the second displacement mediums has a lower coefficient of expansion than the basic body (8).

15. The workpiece according to claim 14, wherein one of the two first and the second displacement mediums (6, 6a) has a coefficient of expansion of <11×10−6/K.

16. The workpiece according to claim 14, wherein the first displacement space (22) has a ring shape and is arranged along the periphery of the basic body (8) in an interior thereof, and the second displacement space (23) is a hollow cylinder which is positioned concentrically, where the first ring-shaped displacement space is arranged around the second cylindrical displacement space (23).

17. The workpiece according to claim 1, wherein the basic body (8) consists of a material which has a modulus of elasticity in a range between 70,000 and 300,000 N/mm$^2$.

18. The workpiece according to claim 17, wherein the material is steel or a steel alloy or a material which comprises steel or steel alloy having a modulus of elasticity between 180,000 and 220,000 N/mm$^2$.

19. The workpiece according to claim 1, wherein the displacement medium (6, 6a) is a single component.

20. The workpiece according to claim 1, wherein displacement medium (6, 6a) is a mixture of at least two components, and each of the at least two components having at least one of a different moduli of elasticity and different coefficients of expansion.

21. The workpiece according to claim 20, wherein the displacement medium (6, 6a) is a binary or ternary mixture.

22. The workpiece according to claim 20, wherein one component of the displacement medium (6, 6a) comprises graphite, quartz, glass fibre or iron/nickel alloy.

23. The workpiece according to claim 21, wherein one component of the displacement medium (6) is a plastic, a plastic mixture or an elastomer.

24. The workpiece according to claim 21, wherein a first component of the displacement medium (6) comprises graphite, quartz, glass fibre or iron/nickel alloy, and a second component is a plastic, a plastic mixture or an elastomer, and the basic body (8) essentially consists of a material having a modulus of elasticity between 70,000 and 300,000 N/mm$^2$.

25. The workpiece according to claim 24, wherein the displacement medium (6) is a binary mixture, where components of the binary mixture are selected from the group consisting of:
   (i) polyester, PVC or elastomer and quartz or glass fibre,
   (ii) polyester, PVC or elastomer and iron/nickel alloy,
   (iii) polyester, PVC or elastomer and graphite,
   (iv) epoxy resin, and graphite, or
   (v) glycols or oils and graphite.

26. The workpiece according to claim 20, wherein the displacement medium comprises 60-98% of graphite, quartz or iron/nickel alloy.

27. The workpiece according to claim 1, wherein the workpiece is a press-fit bolt, a dowel pin, a shaft, an axle, a hub or a component in connection with a clutch or planet carrier.

28. A use of a workpiece according to claim 1 for the secure installation and non-destructive deinstallation of machine components in devices and installations which are subjected to moderate to large forces.

29. The use according to claim 28 for the making of shaft/hub connections.

30. A wind turbine, wherein the wind turbine contains a workpiece according to claim 1.

\* \* \* \* \*